E. WASSMER.
ELECTRIC FURNACE.
APPLICATION FILED DEC. 10, 1910.
985,083.
Patented Feb. 21, 1911.
2 SHEETS—SHEET 1.
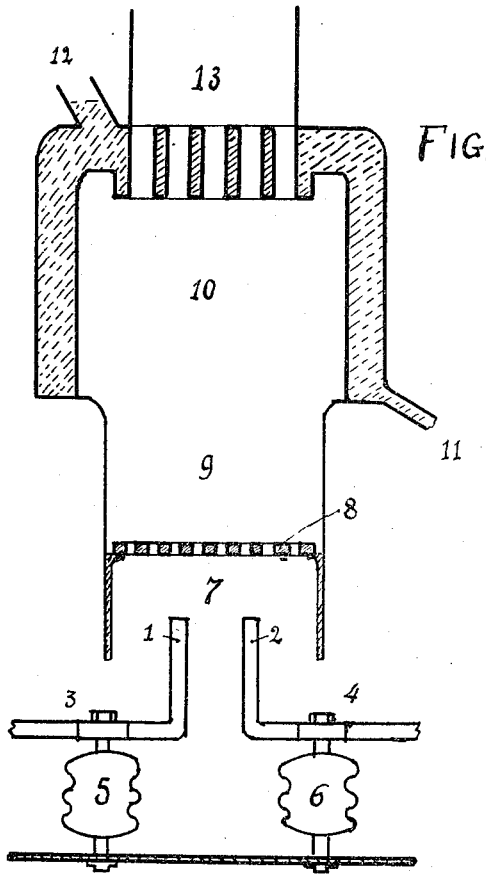
Fig. I
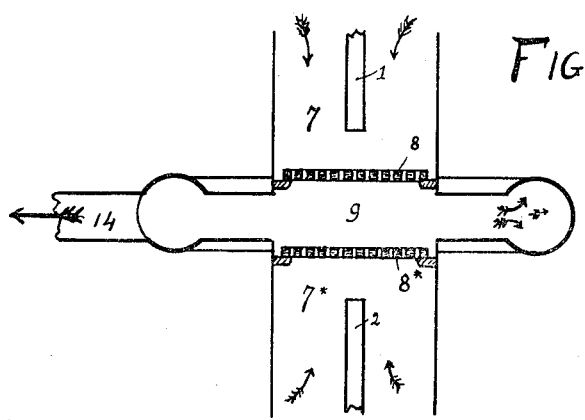
Fig. II
Witnesses.
Arthur George Stevens
Lewis Herbert Kittman
Inventor.
Eugène Wassmer E. WASSMER.
ELECTRIC FURNACE.
APPLICATION FILED DEC. 10, 1910.
985,083.
Patented Feb. 21, 1911.
2 SHEETS—SHEET 2.
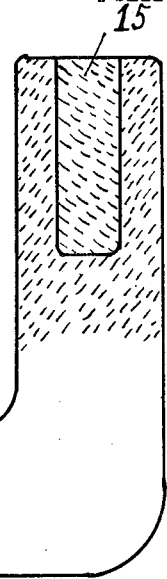
FIG. III
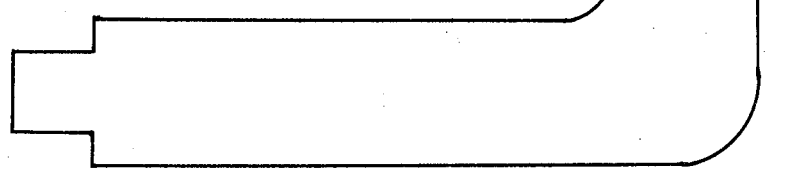
FIG. IV
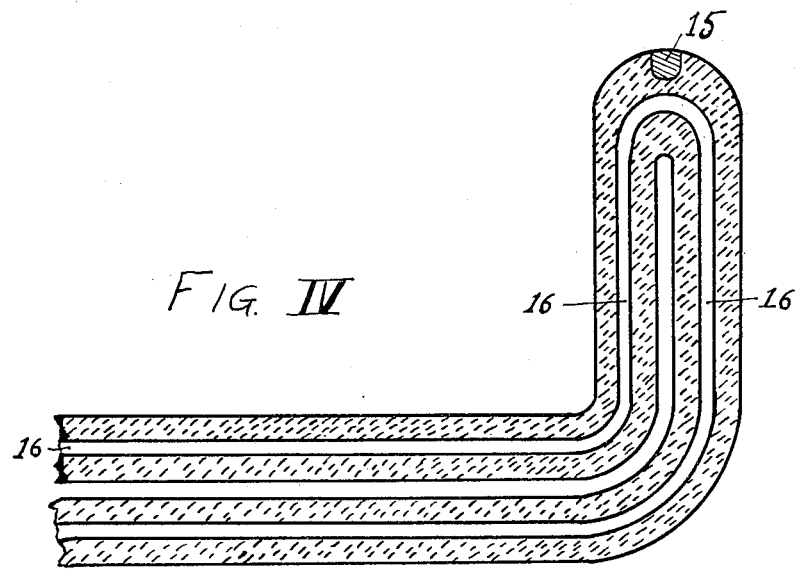
Witnesses.
Arthur George Stevens
Lewis Herbert Rittman
Inventor.
Eugene Wassmer

UNITED STATES PATENT OFFICE.

EUGENE WASSMER, OF LONDON, ENGLAND.

ELECTRIC FURNACE.

985,083.　　　Specification of Letters Patent.　　Patented Feb. 21, 1911.

Application filed December 10, 1910. Serial No. 596,644.

*To all whom it may concern:*

Be it known that I, EUGENE WASSMER, residing at I$^F$ Hyde Park Mansions, London, W., England, have invented new and useful Improvements in and Connected with Electric Furnaces, of which the following is a specification.

My invention relates to improvements in and connected with electric furnaces by means of which certain advantages are obtained. And it has special though not exclusive reference to furnaces for the treatment of gases such for example as the oxidation of the nitrogen of atmospheric air or the production of ammonia from nitrogen and hydrogen.

In carrying my invention into effect I introduce the gases into a chamber, hereinafter termed the reaction chamber, of such form and material and so provided with devices that the gases are subjected to the high temperature of the electric arc in a novel manner so as to bring about the desired reaction and then cooled to a sufficient degree to prevent any further and undesired reaction taking place.

For the purpose of establishing the arc I provide the reaction chamber with electrodes, preferably of the novel kind hereinafter described, and I cause the arc formed between these electrodes, and also the gases introduced into the reaction chamber, to impinge upon a novel device, hereinafter termed the "incandescer", the effect of which is to bring about a more intimate contact between the molecules of the gases taking part in the reaction whereby the desired reaction is more readily obtained. I also cause the gases to be cooled by cooling devices, adapted to the reaction chamber, as soon as possible after the desired reaction has taken place so as to prevent any further and undesired reaction taking place.

The incandescer consists of a perforated diaphragm or grid or the like of refractory material, such for example as oxid of magnesium, sustained on a refractory support so as to be spaced away from the walls of the reaction chamber and its position may be made adjustable in any convenient way if desired.

The cooling devices which I employ for the reaction chamber may be of any convenient kind such for example as radiating gills, water jackets, water or brine ducts, or in some cases open water jets. These devices are applied at that part of the reaction chamber which is remote from the electrodes and which is separated from the electrodes by the incandescer and they are placed as close as may be convenient to the incandescer so that cooling may take place as quickly as possible after the desired reaction has been obtained.

My electrodes may be formed of any of the usual materials except those which would combine with any of the gases introduced into the reaction chamber to form a gaseous product. Thus carbon electrodes would be inadmissible in the case where oxygen is one of the gases admitted as the carbon monoxid or dioxid produced would interfere with the reaction. Copper electrodes as well as most metallic electrodes have the disadvantage of melting at a comparatively low temperature and the existing means of cooling, such for example as the provision of water ducts and radiating gills, are not alone sufficient to prevent fusion or piercing of the metal. In constructing my electrodes therefore I preferably us copper owing to its high conductivity and in addition to providing my electrodes with the usual means of cooling I provide their tips with pits or depressions into which I fit plugs of some refractory material such for example as iron and I may protect the tips or exposed parts of the plugs with a refractory material such for example as oxid of magnesium.

In order that my invention may be readily understood I shall now proceed to describe it with reference to the accompanying drawings, in which, Figure I is a diagram showing in vertical section a form of my invention in which the cooling is produced by a brine jacket. It is to be understood that the relative dimensions of the parts shown in the diagram are not to be taken as indicative of what would be employed for any particular reaction. The actual dimensions especially with regard to the distance between the incandescer and the cooling chamber depend to a large extent upon the particular reaction to be brought about. Fig. II is a diagram showing a modified form of my invention (hereinafter termed my duplex form) in which two opposing currents of gases are employed to impinge upon two incandescers from the space between which the products of the reaction are led to cooling devices. Fig. III shows a simple form of electrode, and Fig. IV a form of electrode having a water circulation for purposes of cooling.

Referring now to Fig. I, 1, 2, are the electrodes between which the arc is established. This may be effected by bringing them into momentary contact and then separating them to strike the arc, or by the employment of a combustible bridging piece of carbon or the like. When this latter plan is adopted care must of course be taken to reject any carbon monoxid or dioxid as hereinbefore mentioned unless of course the case be one in which the presence of such gases is not deleterious. The electrodes 1, 2 are held in clips 3, 4, supported on insulators 5, 6. The electrodes penetrate into an arc chamber 7 to a distance slightly below the incandescer 8. The gases to be combined are admitted in any convenient way and in the desired proportions at the bottom of the arc chamber 7 and they may be forced therethrough by a fan or other pressure giving device. The gases owing to their upward velocity cause the arc to be deflected or blown upward against the incandescer and through the orifices thereof. The incandescer is thus heated to a very high temperature and brings about a reaction between the gases admitted in the space 9 which I term the reaction chamber. Thus if the gases admitted be nitrogen and oxygen the nitrogen is oxidized and we have one or more of the nitrogen oxids formed. There would however be a likelihood of the said oxid or oxids being again split up into the constituents thereof were the temperature to remain sufficiently high. I therefore provide a cooling device of any convenient kind as hereinbefore mentioned immediately above the reaction chamber and surrounding what I term the cooling chamber 10. In the case illustrated the cooling device is assumed to be a brine jacket, the brine entering say at 11 and leaving say at 12. After passing through the cooling chamber the gas or gases are drawn off through the flue 13 and can then be condensed, treated and/or separated by known means.

The function of the incandescer is to break up the stream of the gases entering the arc chamber into a number of streams which pass through the orifices after the manner of a number of jets, and so aid in bringing the molecules of the gases into contact at a high temperature and so cause them to combine readily. The cooling should of course vary with the reaction taking place. In the case of oxygen and nitrogen therefore the cooling should be sufficient to reduce the combined gas or gases to a temperature below that at which they may split up into their constitutents, a temperature which I believe to be about 1600 degrees centigrade.

The respective positions of the electrodes and the incandescer should be easily and readily adjustable so as to suit different reactions.

In Fig. II, I show what I term a duplex form of my invention. Here it will be seen that the electrodes 1, 2, instead of being placed side by side are placed opposite to one another and that two incandescers 8, 8ˣ, are placed between them and that the space between the said incandescers constitute the reaction chamber 9. In this case the gases are led from the reaction chamber by a short tube 14 direct to a separate cooling chamber of any convenient kind. The gases are forced into the arc chambers 7, 7ˣ, in the direction shown by the arrows.

I do not limit myself to any particular form of arrangement of the several parts described and I may multiply the number of reaction chambers and/or of the other parts and force gases through them in parallel.

In Fig. III, I show a simple form of electrode constructed preferably of copper owing to its being a good thermal as well as a good electrical conductor. It has however the disadvantage as previously mentioned of melting at a comparatively low temperature. I therefore provide the tip of the electrode with a plug 15 of refractory material of aluminium or iron.

In Fig. IV, I show in section a cooled electrode which is adapted for higher temperatures than is the simple electrode shown in Fig. III. This electrode is cooled by circulating water or brine through the passage 16 in the well known manner employed in furnace twyers. This form is also provided with an iron or aluminium plug 15.

I have shown the plugs of iron or aluminium as being flush with the extremity of the electrode. I desire it to be understood however that they may project to any desired extent beyond the extremity of the electrode.

It is not necessary that the reaction chamber should be definitely defined and bounded by walls as in some cases it will suffice if it be a mere space below the incandescer in which an arc can be established so as to maintain the incandescer at the high temperature required.

I look upon the reaction chamber as the space in which the desired reaction takes place and it is not necessarily the space which is separated from the arc chamber by the incandescer. It is impossible or practically so to define at what position the reaction commences and ends and it is not unlikely that the spaces within the orifices of the incandescer and perhaps a part even of the arc chamber may be in reality a part of the reaction chamber.

By a cooling chamber I mean the space in which the gaseous products are cooled down below the point of dissociation and wherever this cooling chamber may be situated.

I desire it to be understood that I do not necessarily employ my incandescer in conjunction with my form of electrode. I may if desired employ it in conjunction with other forms of electrode and conversely I may employ my electrodes without employing a nincandescer at all. Further I may employ my incandescer and my electrodes in other forms of electric furnace.

Having thus described my invention, what I claim as new and desire to secure by Letters Patent, is:—

An electric furnace comprising the combination of an arc chamber, a pair of electrodes, two incandescers in the shape of perforated grids between the electrodes to widely spread the arc and to form separate jets or flames, which grids are mounted between the electrodes, and a reaction chamber between the grids, substantially as described.

In witness whereof I have signed my name to this specification in the presence of two subscribing witnesses.

EUGENE WASSMER.

Witnesses:
RIPLEY WILSON,
ARTHUR GEORGE STEVENS.